BEST AVAILABLE COPY

Feb. 18, 1941. C. L. STEBER Des. Re. 21,721

PORTABLE LIGHTING FIXTURE

Original Filed Feb. 12, 1940

INVENTOR.
Clarence L. Steber
BY Spencer, Margall, Johnston & Cook
Atty's

BEST AVAILABLE COPY

Reissued Feb. 18, 1941

Des. Re. 21,721

UNITED STATES PATENT OFFICE 21,721

DESIGN FOR A PORTABLE LIGHTING FIXTURE

Clarence L. Steber, Oak Park, Ill.

Original No. 120,924, dated June 4, 1940, Serial No. 90,217, February 12, 1940, 7 years. Application for reissue September 11, 1940, Serial No. 94,959.

Term of patent 7 years

*To all whom it may concern:*

Be it known that I, Clarence L. Steber, a citizen of the United States, residing at Oak Park, Cook County, Illinois, have invented a new, original and ornamental Design for a Portable Lighting Fixture, of which the following is a specification, reference being had to the accompanying drawing, forming part thereof.

Figure 1:
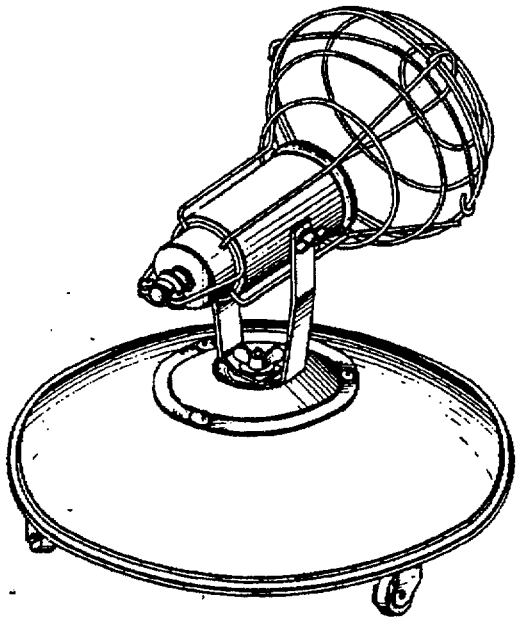
Fig. 1 is a rear perspective view of a portable lighting fixture.
Figure 2:
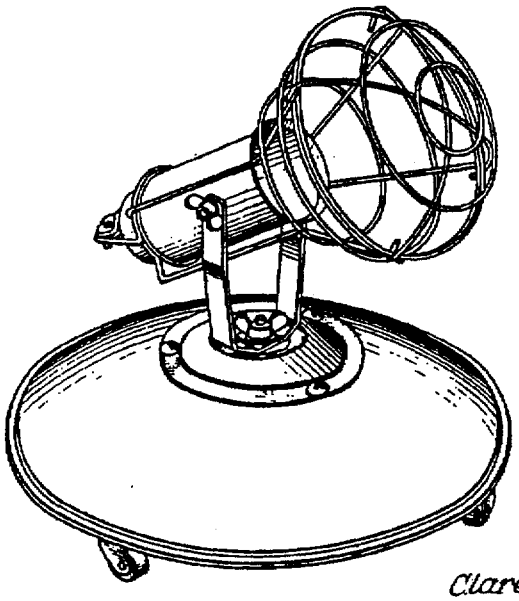
Fig. 2 is a side perspective view of a portable lighting fixture, showing my new design.

I claim:

The ornamental design for a portable lighting fixture, as shown.

CLARENCE L. STEBER.